March 13, 1934.  H. J. LOUNSBURY  1,950,618
HAND BRAKE
Filed May 4, 1931   2 Sheets-Sheet 1
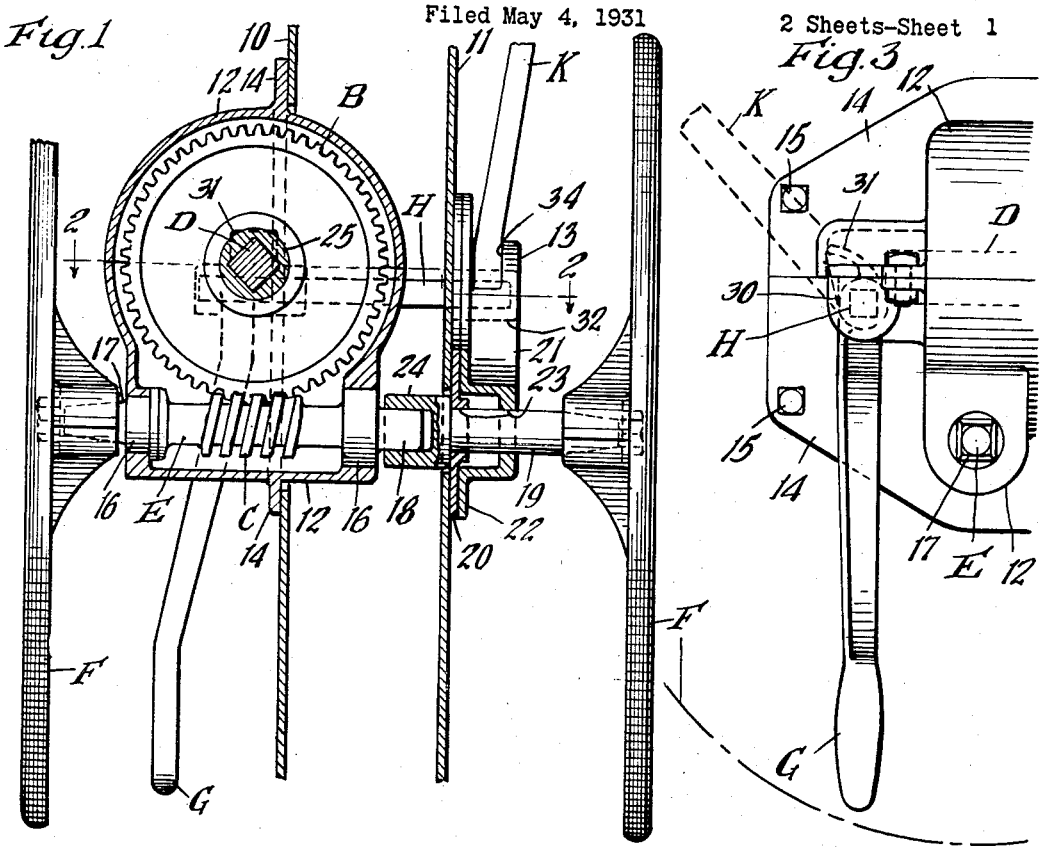
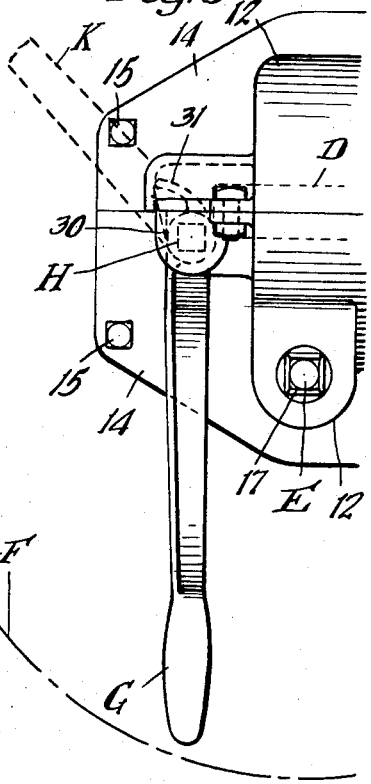
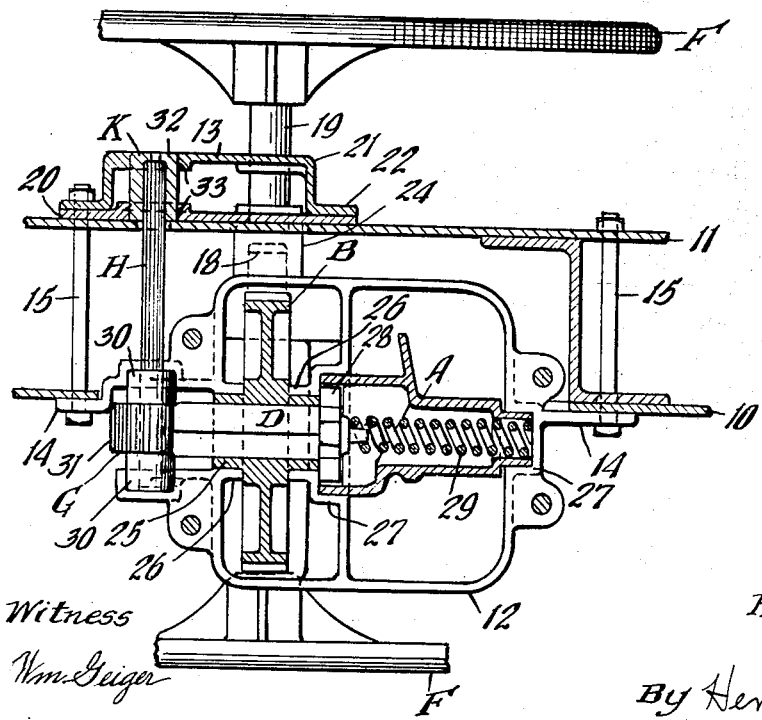
Witness
Wm. Geiger
Inventor
Harvey J. Lounsbury
By Henry Fuchs Atty.

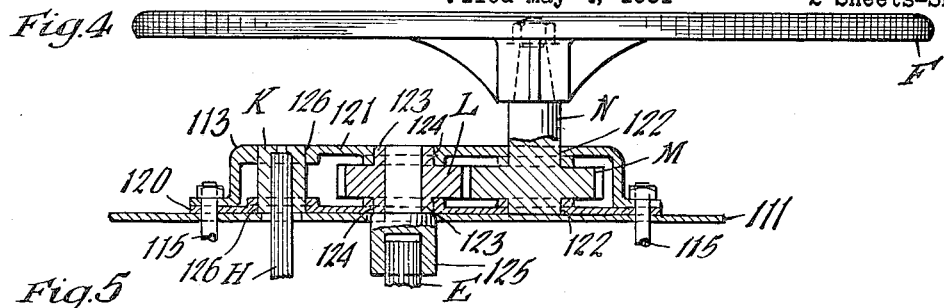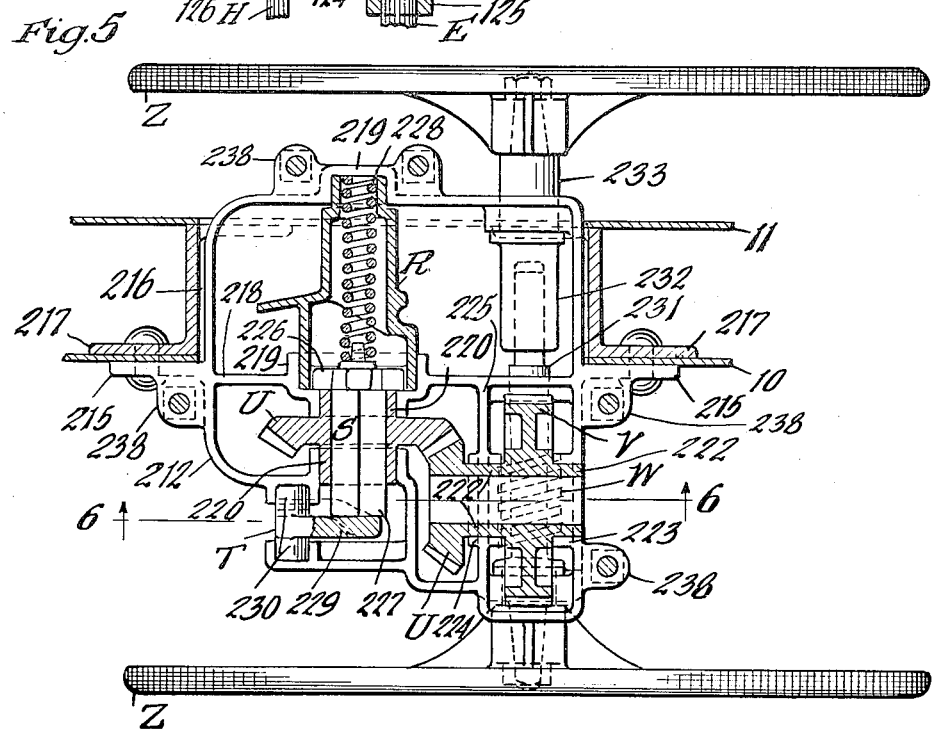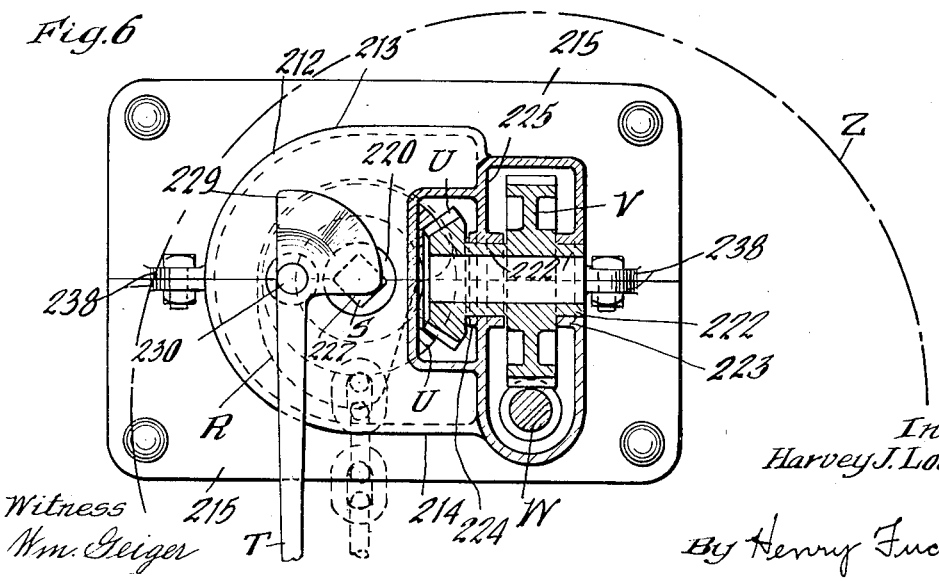

Patented Mar. 13, 1934

1,950,618

UNITED STATES PATENT OFFICE 1,950,618

HAND BRAKE

Harvey J. Lounsbury, Glen Ellyn, Ill., assignor to W. H. Miner, Inc., Chicago, Ill., a corporation of Delaware Application May 4, 1931, Serial No. 534,871

4 Claims. (Cl. 74—112)

This invention relates to improvements in hand brakes.

One object of the invention is to provide an efficient brake mechanism for railway cars so constructed and designed that it may be operated from either the exterior or interior of the car, including operating hand wheels disposed both exteriorly and interiorly of the car, wherein release of the brakes is effected without spinning of the hand wheel, thus protecting the brakeman from injury.

A further object of the invention is to provide a hand brake mechanism of the character described in the preceding paragraph, wherein the operating hand wheels on the interior and exterior of the car are respectively rotatable in reverse directions in tightening the brakes.

A still further object of the invention is to provide a hand brake mechanism so constructed and designed that it may be operated from either the exterior or interior of the car, including operating hand wheels both on the exterior and interior of the car respectively for actuating the chain-winding drum, wherein power-multiplying gearing is interposed between the hand wheels and the drum, and wherein the drum is arranged with the axis of rotation thereof disposed lengthwise of the car.

Other objects of the invention will more clearly appear from the description and claims hereinafter following.

In the drawings, forming a part of this specification, Figure 1 is a vertical sectional view through the end wall of a closed railway car, lengthwise of said car and illustrating my improvements in connection therewith. Figure 2 is a horizontal sectional view corresponding substantially to the line 2—2 of Figure 1. Figure 3 is a partial elevational view of the mechanism, looking from the left in Figure 1, the hand wheel being omitted for the sake of clearness. Figure 4 is a horizontal sectional view similar to Figure 2, illustrating a different embodiment of the invention, only part of the mechanism being shown, the hand wheel on the inner side of the car and the parts immediately adjacent thereto only being shown. Figure 5 is a view similar to Figure 2, illustrating still another embodiment of the invention. And Figure 6 is a vertical sectional view corresponding substantially to the line 6—6 of Figure 5.

Referring first to the embodiment of the invention illustrated in Figures 1, 2, and 3, the end wall of the car is shown in vertical section and is composed of an outer member 10 and an inner member 11, said members being spaced apart the usual distance and being in the form of plates. My improved hand brake mechanism is supported by a main housing 12 secured to the outer wall section 10 and an auxiliary housing 13 secured to the inner face of the inner section 11 of the wall.

My improved hand brake mechanism, as illustrated in Figures 1, 2, and 3, comprises broadly a chain-winding drum A, a worm gear B, a worm C, a clutch D, a two-part operating shaft E for the worm, two hand wheels F—F fixed to the operating shaft, a clutch operating cam lever G exteriorly of the car, an actuating shaft H for the lever, and an interior clutch actuating lever K.

The main housing 12 is of two-part construction, being divided along a horizontal plane, and encloses the chain-winding drum A, the worm gear B, the worm C, the clutch D, and rotatably supports the two-part operating shaft E. As shown most clearly in Figures 2 and 3, both sections of the housing 12 are provided with flange-like plates 14—14 by which the same is secured to the wall section 10, any suitable means being employed for this purpose. As shown, bolts 15—15 are used for this purpose, which extend through the plate-like flanges 14—14, the wall section 10, and also through the wall section 11. The operative parts of the hand brake mechanism disposed within the housing are similar to those shown and described in connection with Olander application, Serial No. 472,235, filed August 1, 1930, and therefore do not require detailed description. As shown, the worm member C is formed as a part of the section of the operating shaft E which is disposed within the housing 12. The operating shaft E has cylindrical bearing portions 16—16 at opposite ends thereof journaled in suitable bearing openings provided in the corresponding front and rear walls of the lower part of the housing 12. The shaft E projects outwardly of the housing at both ends and has the hand wheel F which is disposed exteriorly of the car secured to one end thereof. This end of the shaft, which is indicated by 17, is tapered and of square cross section and fits within an opening of similar shape formed in the hub of the hand wheel. The usual retaining nut is provided at the outer end of the shaft to secure the hand wheel in position. The opposite end of the shaft which projects outwardly of the housing is indicated by 18 and is of substantially square cross section. The other part of the shaft E which carries the hand wheel F disposed on the interior of the car is indicated by 19 and is journaled within the auxiliary housing 13. As shown, the auxiliary housing 13 is made up of two parts, a plate-like wall section 20 and a cover-like member 21 secured thereto. The cover member 21 is flanged, as indicated at 22, and the same is secured to the plate 20 by means of bolts or other retaining elements extending through said flange 22 and the plate 20. These securing elements are preferably also employed to fix the auxiliary housing 13 to the wall section 11 and extend through the latter, one of the bolts 15 being employed for this purpose. The cover section 21 and the plate 20 are provided with aligned bearing openings 23—23 within which the shaft 19 is journaled. At the inner end the shaft 19 is provided with a socket member 24 which receives and fits the square end portion 18 of the section of the shaft E which is journaled in the main housing 12. The hand wheel F which is disposed interiorly of the car is secured to the shaft 19 in the same manner as the hand wheel which is on the outer side of the car.

The worm C meshes with the worm wheel B which has hub sections 25—25 at opposite sides thereof journaled in bearing members 26—26 provided on the upper and lower sections of the main housing 12.

The clutch member D which is in all respects similar to the clutch member disclosed in the Olander application hereinbefore referred to is slidably mounted within the worm wheel B, the hub portions of the worm wheel having a square opening therethrough and the clutch member having a shank of square cross section which slidably fits said opening.

The chain-winding drum A has its opposite ends journaled in bearing openings 27—27 provided on the housing 12. The clutch member D has a clutch head 28 provided with clutching projections which cooperate with similar formations on the interior of the chain-winding drum. The clutch is held in engaged position by a spring 29 which is interposed between the clutch head and the opposed wall of the housing.

The clutch operating cam lever G is pivotally supported in bearings provided on the bottom section of the housing 12, the lever preferably having trunnion members 30—30 at opposite sides thereof which engage in suitable bearing openings on the lower housing section. The lever is provided with a cam head 31 which engages the outer end of the shank of the clutch member D. The actuating shaft H is fixed to the lever G and extends through the inner wall section 11 of the car, as clearly shown in Figures 1 and 2. This shaft is preferably of square cross section and fits within a square opening provided in the trunnion portions of the lever G. The inner end of the shaft H projects into the auxiliary housing 13 and has the operating lever K secured thereto, the operating lever K being provided with a cylindrical hub portion 32 which has a socket of square cross section therein receiving the inner end of the shaft H so that the shaft is rotated with the lever K. The hub portion 32 of the lever K is journaled in openings 33—33 provided respectively in the plate-like section 20 and the cover member 21 of the auxiliary housing 13. The cover section 21 to suitably slotted, as indicated at 34, to accommodate the lever K.

The operation of my improved hand brake mechanism, as illustrated in Figures 1, 2, and 3, in applying the brakes is as follows: The shaft E is rotated by either of the hand wheels F, thereby causing rotation of the worm wheel B. Through rotation of the latter and the connecting clutch D, the chain-winding drum is actuated in the proper direction to wind the chain thereon. In case it is desired to back off or ease up the brakes, the clutch D is left in engagement and either of the hand wheels F rotated in the proper direction. To effect quick release of the brakes, the clutch member is disengaged from the chain-winding drum by means of the cam lever G. To effect this operation the cam lever G is swung to the left and upwardly, as viewed in Figure 3, thereby forcing the clutch to the right, as viewed in Figure 2, against the resistance of the spring 29. When there is occasion to release the brakes from the interior of the car, the operating lever K is manipulated, thereby rotating the shaft H and swinging the cam lever G in the proper direction. As will be evident, when the clutch D is released, the chain-winding drum is free to rotate with respect to the worm wheel B and the other parts of the operating mechanism, thereby permitting the hand wheels F—F to remain stationary and protecting the brakeman against injury which might otherwise occur if the hand wheels were permitted to rotate while releasing the brakes.

Referring next to the embodiment of the invention illustrated in Figure 4, the mechanism with the exception of that located on the inner side of the car is substantially the same as that described in connection with Figures 1, 2, and 3. In Figure 4 the inner wall member of the car is designated by 111. An auxiliary housing 113 is fixed to the inner wall 111 and comprises a plate-like section 120 and a cover member 121. The cover member and the plate-like section are secured together by any suitable means such as bolts 115—115 which extend through the plate-like member 120 and flanges provided on the cover section 121. As shown, the bolts 115 also extend through the wall section 111 of the car and serve to fix the housing thereto. As will be understood, the brake mechanism involved in Figure 4 includes a chain-winding drum, a worm wheel for actuating the drum, a worm member meshing with the worm wheel, a clutch member, a clutch spring, a clutch operating lever exteriorly of the car, and an operating shaft on which the hand wheel on the outer side of the car is secured, all similar to the corresponding parts hereinbefore described in connection with Figures 1, 2, and 3.

The mechanism involved in Figure 4 also includes a hand wheel F on the inner side of the car, which is fixed to the stub shaft N having a pinion M formed integral therewith. The pinion M is disposed within the auxiliary housing 113 and the stub shaft N is rotatably supported in aligned bearing openings 122—122 provided in the plate 120 and the cover member 121 respectively. The pinion M meshes with a second pinion L having hub portions 123—123 journaled respectively in openings 124—124 provided in the plate 120 and the cover member 121. A socket member 125 is connected to the pinion L for rotation therewith. The socket member 125 preferably has a square shank which is fitted within a square opening in the hub of the pinion L. The opening of the socket member 125 is of square cross-section and receives and fits the outer end of the worm shaft E. As will be evident, the intermeshing pinions L and M provide for rotation of the worm shaft E in a direction reverse to the rotation of the hand wheel F located interiorly of the car. By this arrangement rotation in reverse directions of the hand wheels on the exterior and interior of the car is provided during either tightening of the brakes or backing up and easing off the same. The clutch mechanism is operated in a manner similar to that described in connection with Figures 1, 2, and 3, the clutch shaft H being connected to the lever K which has journal portions rotatably supported in bearing openings 126—126 provided in the plate 120 and cover member 121 of the auxiliary housing 113.

Referring next to the embodiment of the invention illustrated in Figures 5 and 6, my improved hand brake mechanism is supported within a two-part housing 212 supported on the end wall of the car. The end wall of the car, as shown in Figure 5, is composed of an outer member 10 and an inner member 11, similar to the members 10 and 11 hereinbefore described in connection with Figures 1, 2, and 3. The housing is divided horizontally, the upper section thereof being indicated by 213 and the lower section by 214. The two sections are provided with plate-like flanges 215—215 by which the housing is fixed to the outer wall member 10. Both housing sections 213 and 214 have portions thereof disposed inwardly of the flanges 215—215, which portions are disposed within an opening 216 provided in the end wall of the car. Suitable reinforcing angle plates 217—217 are provided to reinforce the walls at said opening, corresponding angular portions of said plates forming the opposed side walls of said opening. The housing sections are also provided with a vertical transverse partition wall 218 which is approximately aligned with the flanges 215—215 of said sections and separates the housing into inner and outer chambers. The housing sections are fixed together in any suitable manner and as herein shown are provided with a plurality of ears 238—238 at their meeting edges which are connected by bolts or like securing elements.

My improved hand brake mechanism proper, as illustrated in Figures 5 and 6, comprises broadly a chain-winding drum R, a clutch S, a clutch operating lever T, two bevel gears U—U, a worm wheel V, a worm W, and two operating hand wheels Z—Z.

The chain-winding drum R is rotatable about a horizontal axis and has its opposite ends mounted in bearings 219—219 provided in the rear wall and the partition wall respectively of the housing. One of the bevel gears U is mounted for rotation about an axis coinciding with the axis of the drum and has hub portions 220—220 at opposite sides thereof which are journaled in bearing members 221—221. The second bevel gear U, which meshes with the gear just referred to, is rotatable about an axis at right angles to the axis of rotation with the first-named gear and has hub portions 222—222 rotatably supported in bearing openings 223 and 224 provided in a wall of the housing and a partition wall 225. The worm wheel V which is rotatable with the second-named bevel gear is preferably formed integral therewith, as shown in both Figures 5 and 6. The clutch S which cooperates with the first-named bevel gear U and the chain-winding drum is of the same design as the clutch described in connection with Figures 1, 2, and 3, the same having a clutch head 226 at the inner end thereof cooperating with internal clutch formations on the chain-winding drum. The shank of the clutch, which is indicated by 227, is slidably mounted within the hub portion of the cooperating bevel gear U, being of square cross section and fitting the opening of the hub of the gear, which opening is of similar cross section. The clutch S is held engaged by the spring 228 which is interposed between the clutch head and the opposed wall of the housing.

The clutch is actuated by means of the lever T which has a sector-shaped cam head 229 at the upper end thereof cooperating with the outer end of the shank of the clutch S. The lever T is pivotally supported by means of trunnions 230—230 at opposite sides of the cam head thereof journaled in bearing seats provided on the housing walls.

The worm wheel V is driven by the worm W which is preferably formed integral with a shaft 231 having its opposite ends journaled in bearing openings provided in the front wall of the housing and the partition wall 218 respectively. The shaft 231 projects outwardly of the front wall of the housing and has one of the hand wheels Z secured thereto. The inner end of the shaft 231 also extends beyond the partition wall 218 of the housing and engages within a socket 232 provided on the inner end of a stub shaft 233 journaled in the rear wall of the housing and having the other hand wheel Z secured to the end thereof.

The brake mechanism may be manipulated by either of the hand wheels Z—Z to tighten the brakes or back up and ease off the same by rotating the proper hand wheel, thus rotating the worm, worm wheel, and intermeshing bevel gears, and transmitting the motion to the chain-winding drum. At this time the clutch S is in engaged position. To effect quick release of the brakes, the lever T is swung to the left and upwardly, as viewed in Figure 6, thereby oscillating the cam head 229 and forcing the clutch inwardly against the clutch spring and disengaging the clutch head from the cooperating clutch means of the drum. The drum will thus be free to rotate with respect to the aligned bevel gear U. As will be evident, during this releasing action no movement is communicated to the bevel gears U—U, the worm wheel, the worm, and the hand wheels Z—Z.

I have herein shown and described what I now consider the preferred manner of carrying out my invention, but the same is merely illustrative and I contemplate all changes and modifications that come within the scope of the claims appended hereto.

I claim:

1. In a hand brake for a railway car, said car having a vertical end wall, the combination with a housing secured to the inner side of said wall; of a rotary operating shaft journaled in said housing and extending through said wall; a hand wheel on the inner side of said wall, said hand wheel being fixed to said shaft; a hand wheel on the outer side of said wall operatively connected to said shaft; chain-winding means within the housing; gear means within the housing operated by said shaft; a clutch operatively connecting said gear means and chain-winding means; means for actuating said clutch including a rotary clutch shaft and operating levers fixed to opposite ends of said clutch shaft, said last named shaft extending through said wall and said operating levers being diposed respectively on the inner and outer sides of said wall; and a supporting bracket fixed to the outer side of said wall, said bracket having journal bearing openings therein accommodating the outer end portions of the operating and clutch shafts.

2. In a hand brake for a closed railway car, said car having a vertical end wall, the combination with a housing fixed to the inner side of said wall; of a supporting bracket secured to the outer side of said wall; a two-part operating shaft extending through said end wall, one part of said shaft being journaled in the housing and the other part of said shaft extending through and being journaled in the supporting bracket, said last named part of the shaft projecting outwardly of said bracket; a hand wheel on the outer side of said wall fixed to said projecting end of the second named part of said shaft, said parts of the shaft being operatively connected by a portion of angular section on one part fitting within a socket of similar section on the other part; a hand wheel on the inner side of said wall fixed to the first named part of said shaft; chain-winding means within the housing operated by said shaft; a clutch operatively connecting said operating shaft and winding means; a rotary clutch actuating shaft extending through said end wall of the car, said clutch shaft being journaled at opposite ends in said housing and bracket; and levers on the inner and outer sides of said end wall of the car, said levers being fixed to opposite ends of said clutch actuating shaft.

3. In a hand brake mechanism for a railway car, said car having a vertical end wall comprising inner and outer spaced wall members, the combination with a housing secured to the inner side of the inner wall member; of an operating shaft journaled in said housing and extending through the inner and outer wall members; chain-winding means within the housing actuated by said shaft; a clutch operatively connecting said shaft and winding means; an oscillatory clutch operating shaft journaled in said housing and extending through said inner and outer wall members; a supporting housing fixed to the outer side of said outer wall member, said last named housing having journal bearings therein rotatably supporting the outer ends of said operating shaft and clutch shaft; and actuating levers fixed to opposite ends of said clutch shaft, the actuating lever which is at the outer end of said clutch shaft extending into said second named housing.

4. In a hand brake mechanism for a railway car, said car having a vertical end wall comprising inner and outer spaced wall members, the combination with a housing secured to the inner side of the inner wall member; of an operating shaft journaled in said housing and extending through the inner and outer wall members; chain-winding means within the housing actuated by said shaft; a clutch operatively connecting said shaft and winding means; an oscillatory clutch operating shaft journaled in said housing and extending through said inner and outer wall members; a supporting housing fixed to the outer side of said outer wall member, said last named housing having journal bearings therein rotatably supporting the outer ends of said operating shaft and clutch shaft; and actuating levers fixed to opposite ends of said clutch shaft, the actuating lever which is at the outer end of said clutch shaft having a journal portion swingingly supported within said last named housing, said journal portion having an axial socket of angular cross section and the outer end portion of said clutch operating shaft being formed of angular cross section, said outer end portion fitting within said socket.

HARVEY J. LOUNSBURY.